United States Patent
Lo et al.

(10) Patent No.: US 7,266,076 B2
(45) Date of Patent: Sep. 4, 2007

(54) AUTOMATIC DETECTING DEVICE FOR LAND PRE-PITS SIGNALS

(75) Inventors: Feng-Hsiang Lo, Hsinchu (TW);
Yong-Long Lee, Hsinchu (TW);
Kuo-Ding Shin, Hsinchu (TW);
Chin-Shou Huang, Hsinchu (TW);
Shin-Huei Wu, Hsinchu (TW);
Chih-Chung Wu, Hsinchu (TW);
Shin-Bo Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 687 days.

(21) Appl. No.: 10/743,429

(22) Filed: Dec. 23, 2003

(65) Prior Publication Data

US 2005/0002304 A1 Jan. 6, 2005

(30) Foreign Application Priority Data

Jul. 3, 2003 (TW) .............................. 92118247 A

(51) Int. Cl.
*G11B 7/00* (2006.01)

(52) U.S. Cl. ................... 369/275.4; 369/59.17

(58) Field of Classification Search ............ None
See application file for complete search history.

(56) References Cited

U.S. PATENT DOCUMENTS

| | | | | |
|---|---|---|---|---|
| 6,487,149 | B1 * | 11/2002 | Yokoi et al. | 369/47.25 |
| 6,744,721 | B2 * | 6/2004 | Kamioka et al. | 369/124.12 |
| 6,912,190 | B2 * | 6/2005 | Inokuchi et al. | 369/59.15 |
| 7,079,475 | B2 * | 7/2006 | Hagiwara | 369/124.12 |

* cited by examiner

*Primary Examiner*—William Korzuch
*Assistant Examiner*—Joseph Haley
(74) *Attorney, Agent, or Firm*—Birch, Stewart, Kolasch & Birch, LLP

(57) ABSTRACT

An automatic detecting device of land pre-pits signal is disclosed. The device adjusts gain of push-pull signals to raise the signal to noise ratio of the land pre-pits signal to the wobble signal. Digital logic computation is also utilized to recognize the practical position of the land pre-pits. The level automatic detection of the RC circuit and the fixed slice level compose an automatic slice level, which is the basis for detecting the land pre-pits. The disclosed device eliminates the drawback of not easy to obtain correct land pre-pits signal from written disks by the conventional of fixed land pre-pits slice level technology.

7 Claims, 8 Drawing Sheets

AUTOMATIC DETECTING DEVICE FOR LAND PRE-PITS SIGNALS

This nonprovisional application claims priority under 35 U.S.C. § 119 (a) on Patent Application No(s). 092118247 filed in TAIWAN, R.O.C. on Jul. 3, 2003, which is (are) herein incorporated by reference.

BACKGROUND OF THE INVENTION

1. Field of Invention

The invention relates to an automatic detecting device for signals of land pre-pits on digital video/audio optical disks, utilizing gain adjustment of push-pull signals to raise the signal to noise ratio of the land pre-pits signal to the wobble signal. Digital logic computation is also utilized to recognize the practical position of the land pre-pits. The level automatic detection of the RC circuit and the fixed slice level compose an automatic slice level, which is the basis for detecting the land pre-pits.

2. Related Art

A current write-once DVD (DVD-R) or re-writable DVD (DVD-RW) has the same structure, where records relative data, such as laser wavelength, write power, write strategy, manufactures, or track positions. FIG. 1A illustrates the schematic diagram of the data tracks of a DVD. The land pre-pits 15 of a DVD-R or a DVD-RW are formed in the grooves 17 relative to the peak of the wobbles. The grooves 11 and the lands 17 interlace with each other. After data are recorded in the grooves 11 of the disk, a mark 12 is written in the pre-pits area 15 of the land 17, as shown in FIG. 1B. The un-continuity of the lands 17 in each land pre-pits area 15 results in edge effect of heat diffusion. The mark 12 in the grooves 11 diffuses to the pre-pits area 15. The LPP signal is thus influenced. The amplitude of LPP signals relative to the wobble signal decreases after data are written onto the disk. This leads to decrease of the signal to noise ratio.

FIG. 2A shows the waveform of land pre-pits (LPP) signals not being affected by written data before writing a DVD. A constant LPP slice level, as denoted by dot lines in the figure, is adopted to obtain correct digital LPP signals through comparators. FIG. 2B shows the waveforms after the DVD is written. The LPP signal is usually generated by push-pull approach and constant LPP slice level. The LPP signal is illustrated as waveform A. After data are written on the disk, the amplitude of the LPP signals relative to the wobble signals recesses, which is illustrated as waveform B in the figure. In this situation, adoption of the constant LPP signal slice level brings low accuracy of the LPP signal. The accuracy is still low, even after being protected through Error Correcting Code (ECC). The phenomenon affects access of the lead-in information of the disk drive and access of the address during track jump. The characteristic of the LPP signal of the inner circle and that of the outer circle is not in unanimity during tracking following on the same disk. Furthermore, the influence of written data, the difference between different disks, and writing times lead to accuracy decrease of the LPP signals. Therefore, an automatic level adjusting mechanism is necessary to obtain correct LPP signals under all circumstances.

FIG. 3 describes the circuit for generating LPP signals of the prior art. The circuit involves comparing the fixed LPP slice level V1 and the LPP signal V2 in the comparator 31 to obtain the LPP slice signal V12. The LPP slice signal V12 is synchronized with the wobble clock V3 through the noise gate 33 in the circuit to eliminate unnecessary glitches. The filtered LPP slice signal V4 is delivered to a LPP decoder 35. Under the influence of high frequency RF signals, the amplitude of LPP signals relative to the wobble signal decrease after data are written onto the disk. Therefore, the credibility of the LPP slice signal before writing data onto the DVD is better than that after writing data onto the DVD.

FIG. 4 illustrates the block diagram of the circuit of the prior art for amending the slice level of land pre-pits. The circuit improves the method of the constant slice level of land pre-pits. The land pre-pits signal V2 is delivered to a level limiter 41 and filtered by a band pass filter 43, thereby amending the slice level. The filtered signal is then computed with the constant slice level V1 and the computed signal is then sent to the comparator 31 to compare with the land pre-pits signal V2. The land pre-pits signal V12 is thus obtained. In order to eliminate the unnecessary pulse interference, the land pre-pits signal V12 is synchronized with the wobble clock V3 through the noise gate circuit 33. The protected land pre-pits signal V4 is then generated and delivered to the land pre-pits decoding circuit 35. However, the affection of the adjacent land pre-pits causes the insufficient amendment in the slice level and erroneous judgment of land pre-pits. The accuracy rate of the LPP signals is not improved too much.

The invention employs automatic detection to detect the variation of the wobble signals to overcome the technical difficulties of prior art, and improves the accuracy rate of the LPP signals in coordination with digital logic computation.

SUMMARY OF THE INVENTION

The main object of the invention is to provide an automatic detecting device for land pre-pits signals. The LPP auto slice level technology overcomes the heat diffusion affection of the LPP signal on the land when writing data in grooves. The heat diffusion weakens the amplitude of the written LPP signal. Therefore, adopting a constant LPP slice level is not easy to obtain the LPP signal precisely. In order to raise the signal to the noise ratio of the LPP signal and wobble signal, the gain of the push-pull signal is adjusted. The practical position of land pre-pits is recognized by digital logical technology. Judgment of the land pre-pits is based on the automatic slice level, combined with the level automatic detection of the RC circuit and the fixed slice level. The method involves the influence of the written data to the wobble signal such that the possibility of slicing error digital LPP signals is greatly reduced. The drawback of not easily obtainable correct LPP signals from disks with recorded data through the constant LPP slice level technology of prior art is eliminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given n the illustration below only, and is thus not limitative of the present invention, and wherein.

DETAILED DESCRIPTION OF THE INVENTION

Figure 1A:
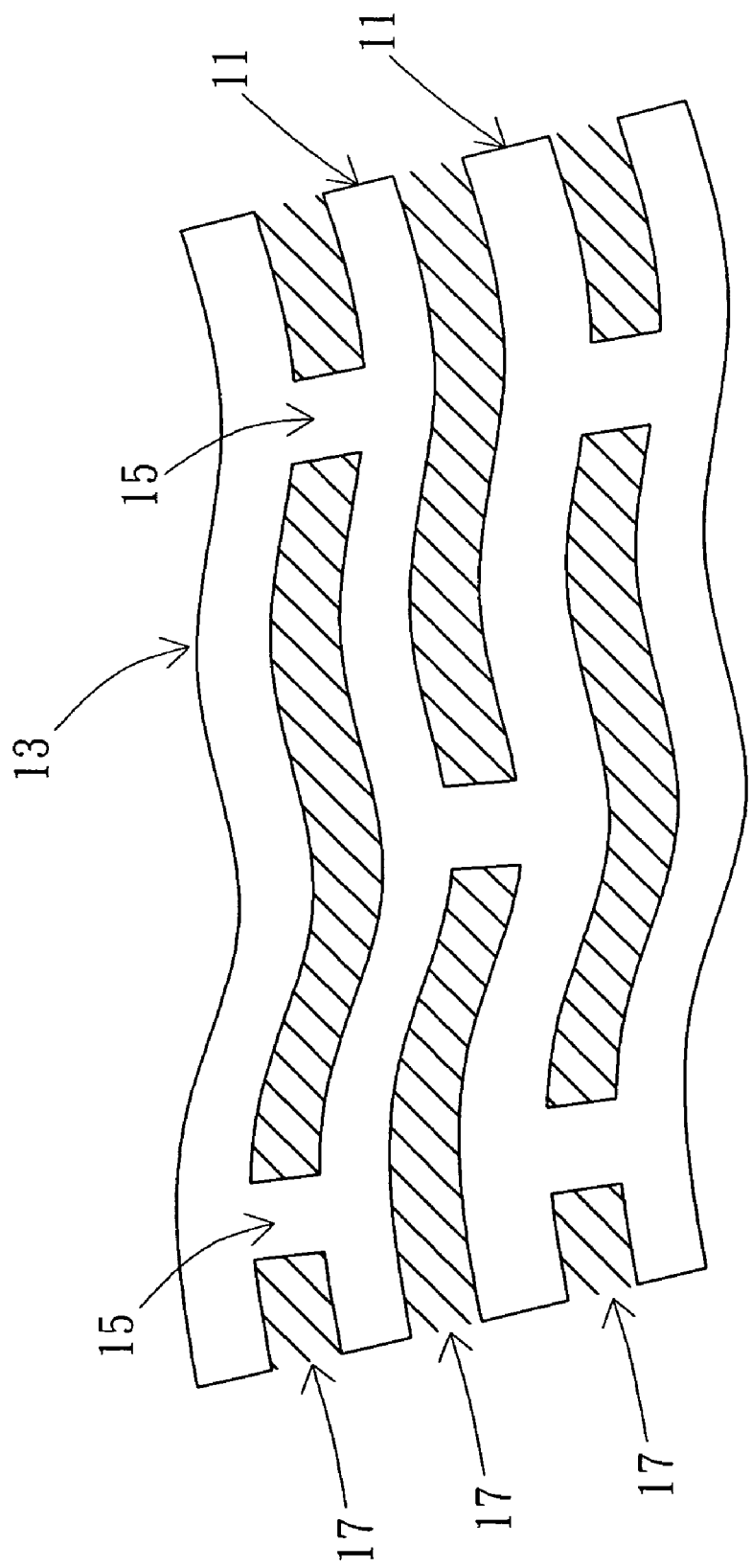
FIG. 1A is the schematic diagram of data tracks of a writable DVD of the prior art.
Figure 1B:
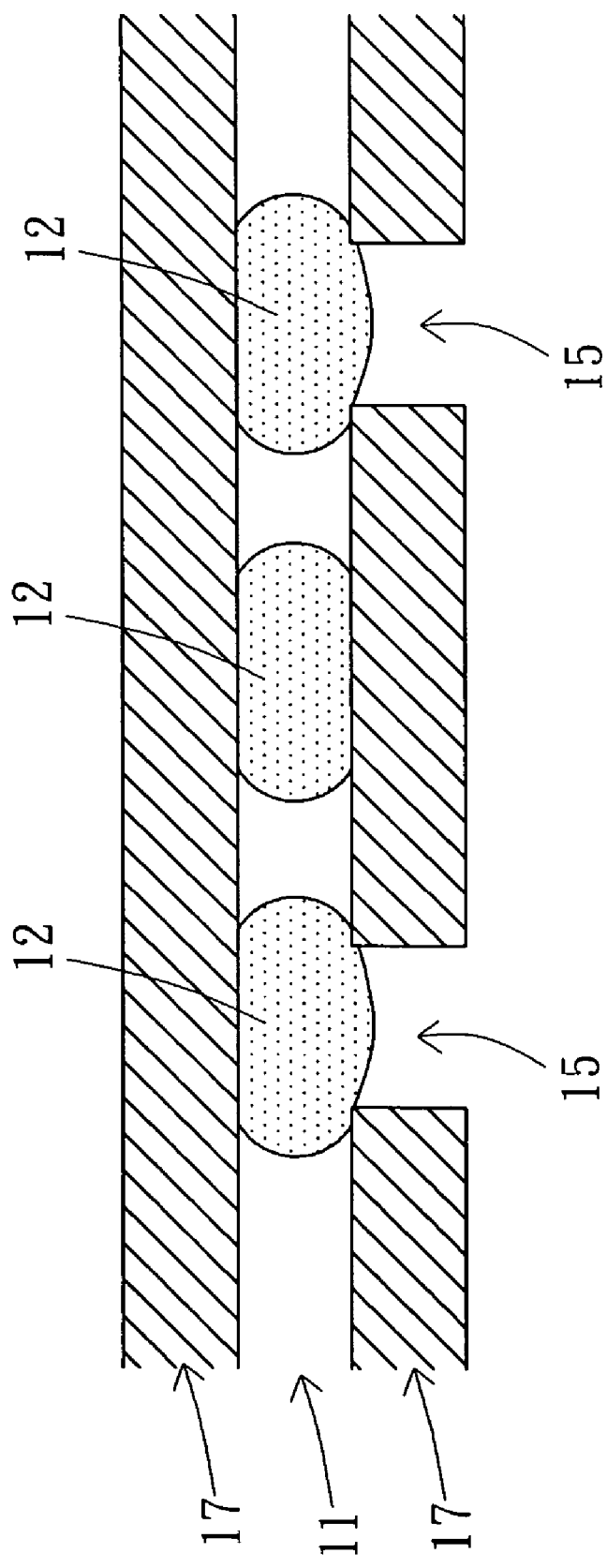
FIG. 1B is the schematic diagram showing writing data.
Figure 2B:
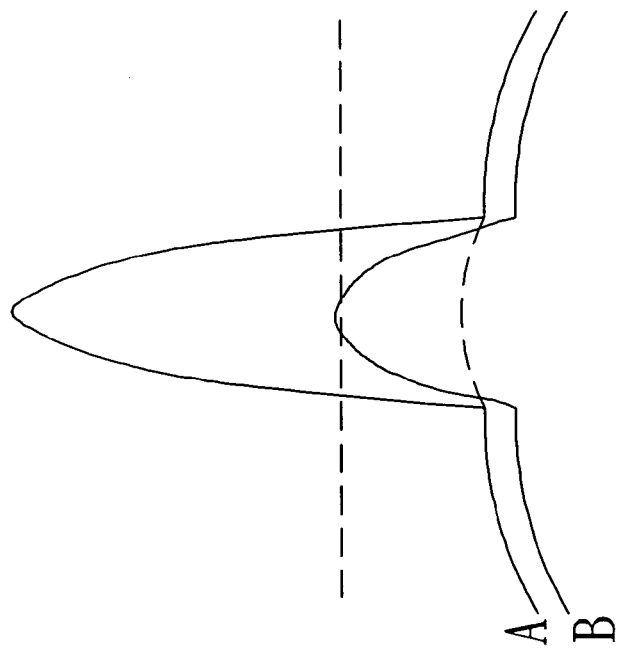
FIG. 2B is the waveform of the LPP signal of a writable DVD after writing.
Figure 2A:
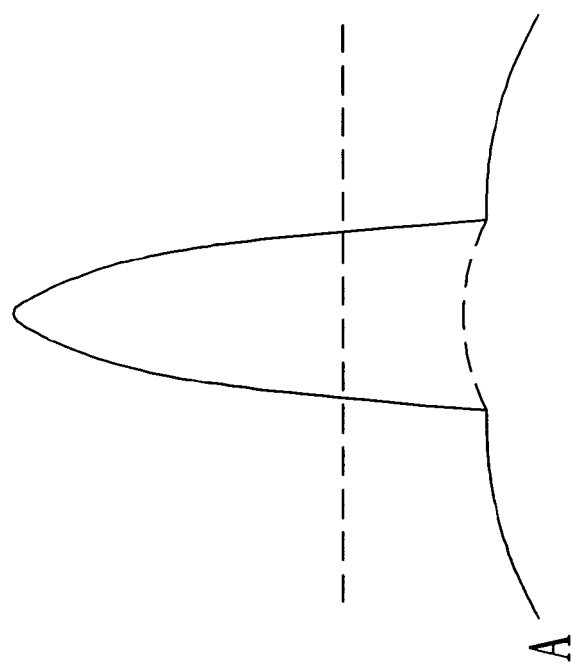
FIG. 2A is the waveform of the LPP signal of a writable DVD before writing.
Figure 3:
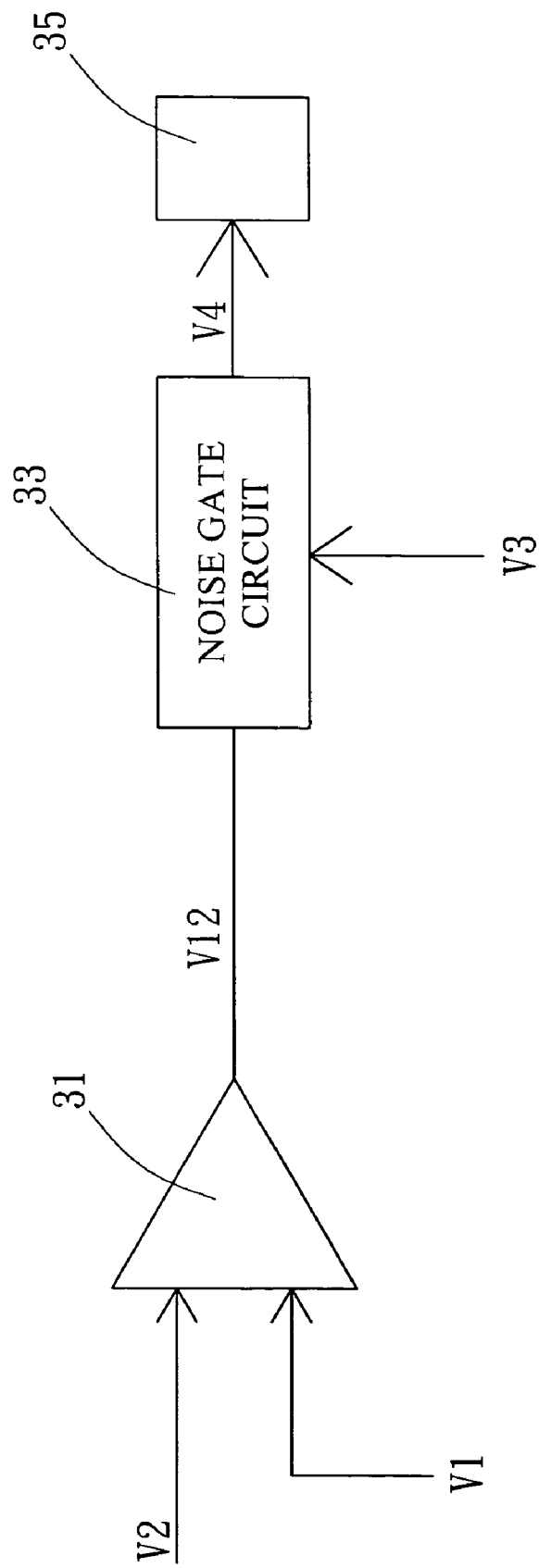
FIG. 3 is LPP signal generating circuit of the prior art.
Figure 4:
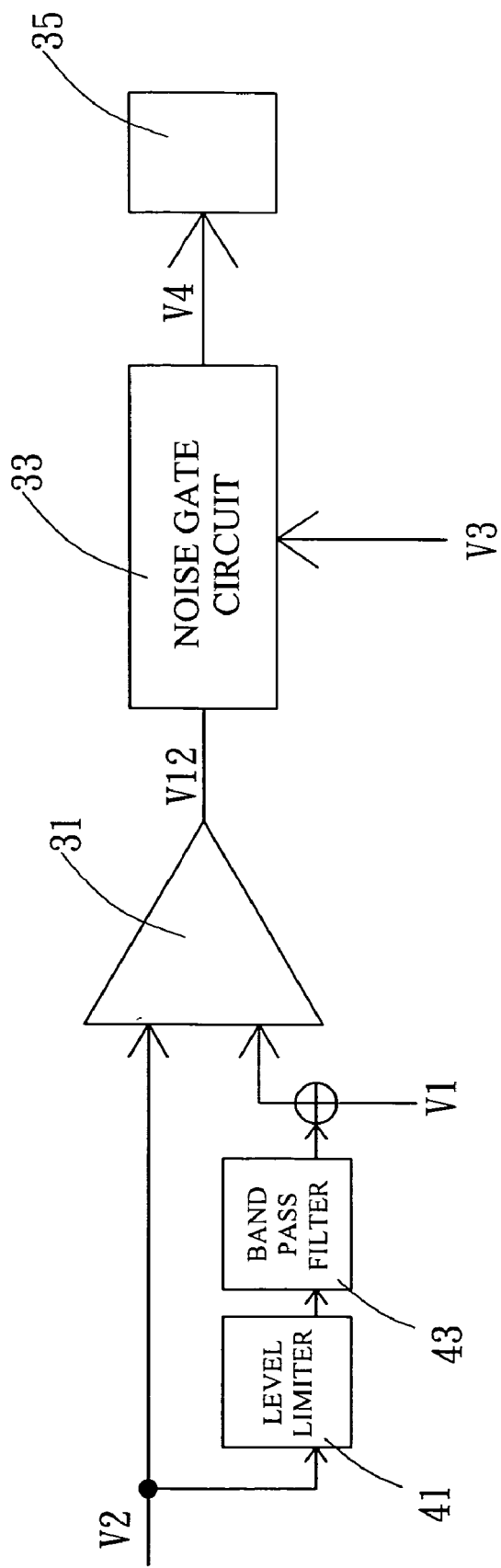
FIG. 4 is the circuit for amending LPP slice level.
Figure 5:
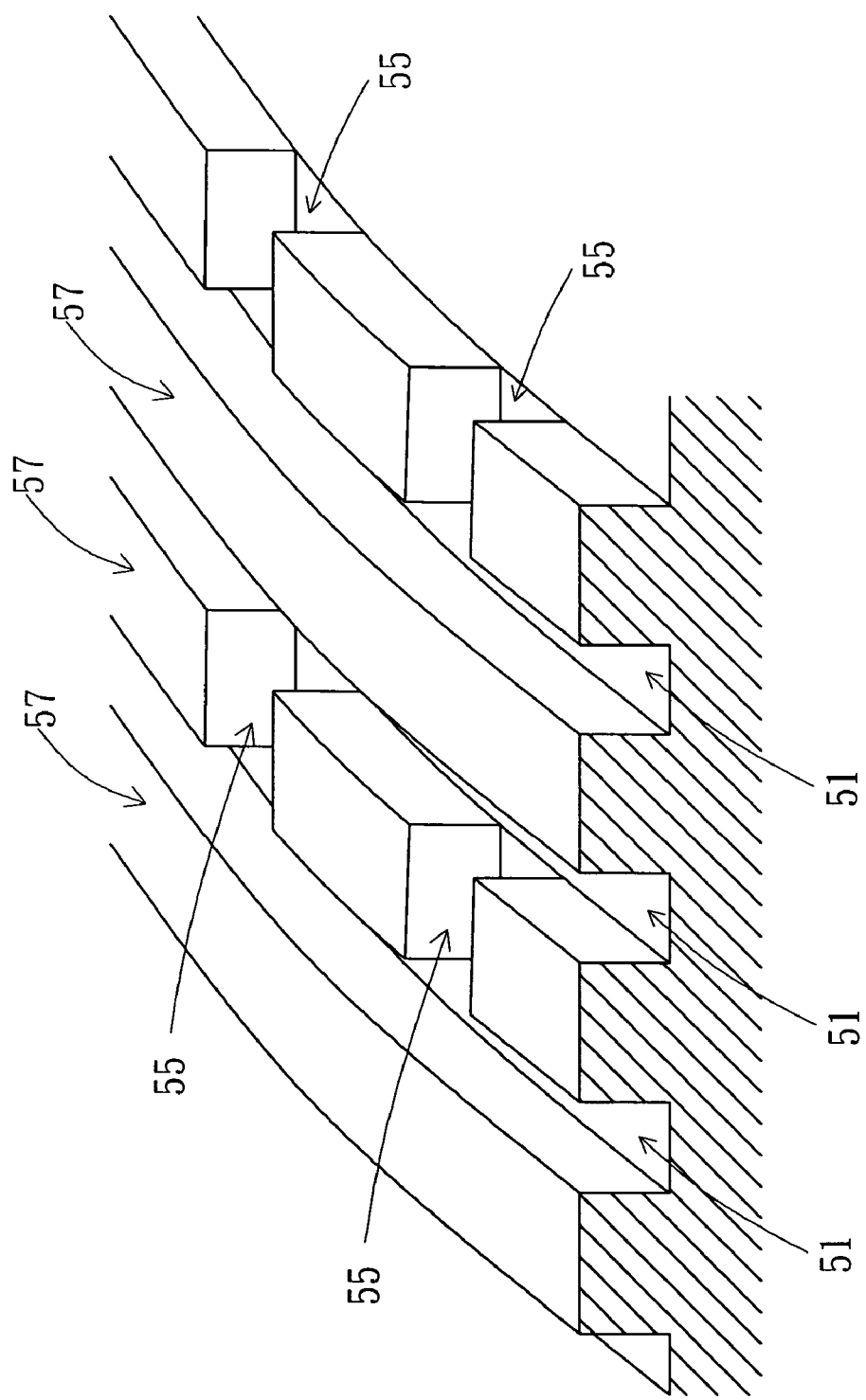
FIG. 5 is the schematic diagram the data tracks of a writable DVD.

FIG. 5 illustrates the data tracks of a writable DVD. The figure shows the relationship of the wobble signals and land pre-pits (LPP). The land pre-pits 55 on the writable DVD are formed on the peak of the wobbles on the lands 57. The grooves 51 and the lands 57 interlace with each other on the data tracks. The push-pull method is employed to obtain the LPP signals from the lands 57. The gain of the puhs-pull signals is properly adjusted in order to raise the signal to the noise ratio of the grooves 51 to the wobble signals.

Figure 6:
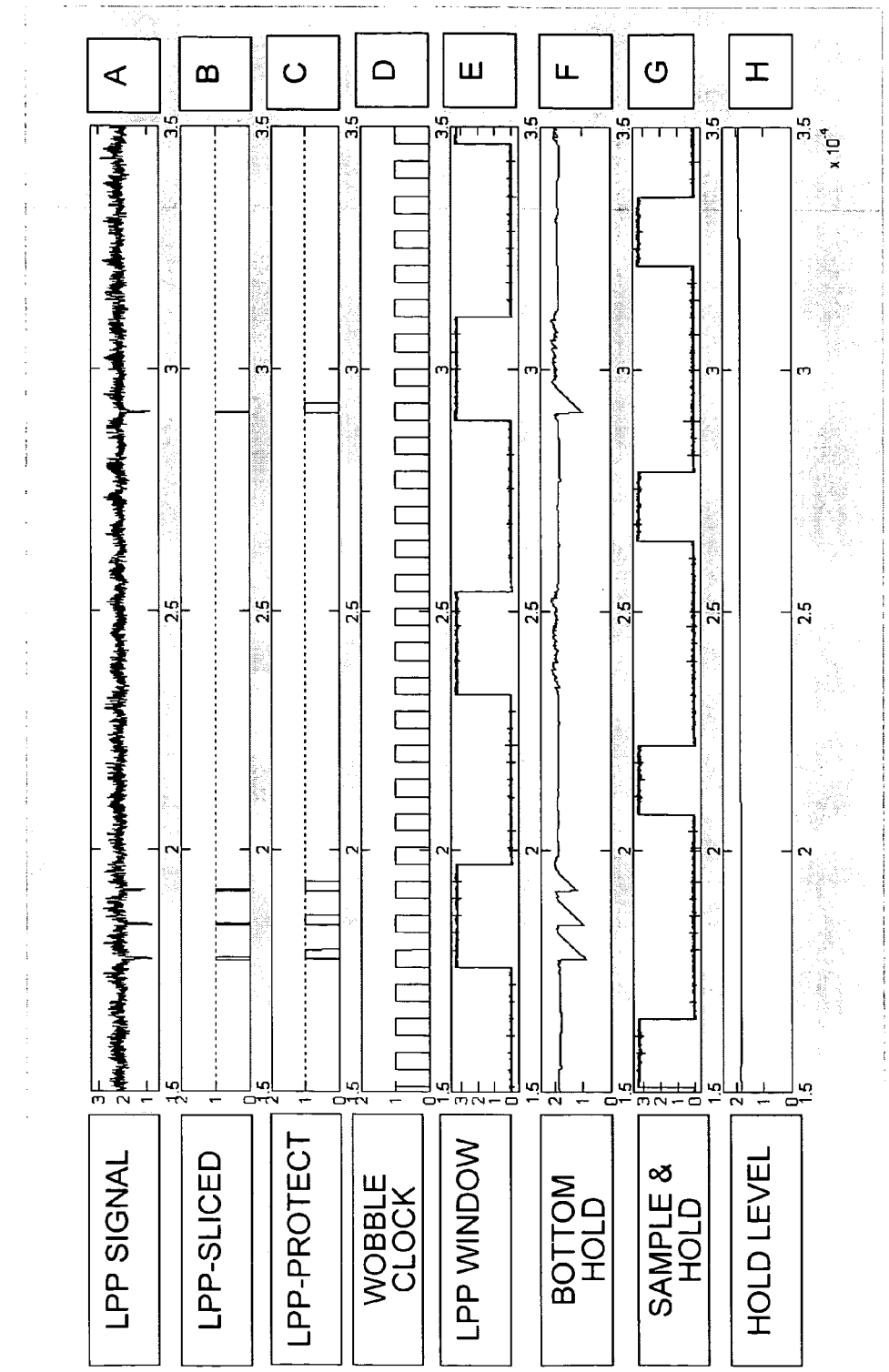
FIG. 6 is the signal of LPP automatic detection slice level of the invention.

The invention discloses two methods to raise the accuracy rate of digital LPP signals. FIG. 6 describes the signals of the LPP signals automatic detecting the slice level of the embodiment of the invention. In view of digital signal processing, an optical pickup head retrieves a LPP signal, as shown in part A in the figure. In order to obtain the LPP position, a digital logic circuit is used to generate a wobble clock, as shown in part D in the figure. Two adjacent land pre-pits are separated by at least 8 wobble clocks according to the DVD specification. The LPP signal is divided into several portions according to the wobble signal. Each portion has eight wobble clocks. The previous three clocks may include LPP signals, while the latter five wobble signals do not have the LPP signals. A LPP window, as shown in part E in FIG. 6, is generated for forecast in accordance to the wobble clock. The LPP window, which is open for three clocks and close for five clocks, is used as switching timing of RC impedance. The previous three clocks are for fast RC charge/discharge processing, while the latter five clocks are for slow RC charge/discharge processing, and a bottom hold signal is then generated accordingly, as shown in part F of FIG. 6. A sample and hold signal in part G of FIG. 6 is used to retrieve the bottom hold signal to obtain the hold level signal as shown in part H of FIG. 6. After obtaining the LPP-sliced signal, it needs to be synchronized with the wobble clocks in order to obtain the LPP-protect signal as shown in part C in FIG. 6. The correct positions of LPP are consequently obtained, and the unnecessary glitches are eliminated. LPP Error Code Detection and Correction then proceeds to obtain precise LPP information.

In view of analog signal processing, the invention utilizes an automatic slice level. The sample and hold signal in FIG. 6 are used to sample and hold the LPP bottom signal in the area without land pre-pits. The level of the LPP bottom signal is recorded in the capacitor based on the RC charge/discharge principle. The RC circuit with larger resister value is used to sample and hold the LPP bottom signal to obtain a stable bottom signal level. In the area with land pre-pits, the sampled and held bottom signal and a fixed slice level are performed as analog computation to obtain a level-slicing signal. The digital LPP signals are obtained from a comparator processing the obtained level and the LPP signal. To avoid the stable bottom signal level in the RC circuit from being affected by the LPP signal, the resister value in the RC circuit becomes smaller when the LPP window is at high level such that quick change can prevent the bottom signal from being affected by the LPP signal. Therefore, the LPP bottom signal varies severely when the LPP window is at high level. The amplitude variation of the wobble signal caused by adjacent tracks and the influence after data writing can be eliminated through the proper slice level, generated by the LPP signal level automatic detecting device, to prevent the comparator from generating erroneous digital LPP signals and to raise the accurate rate.

Figure 7:
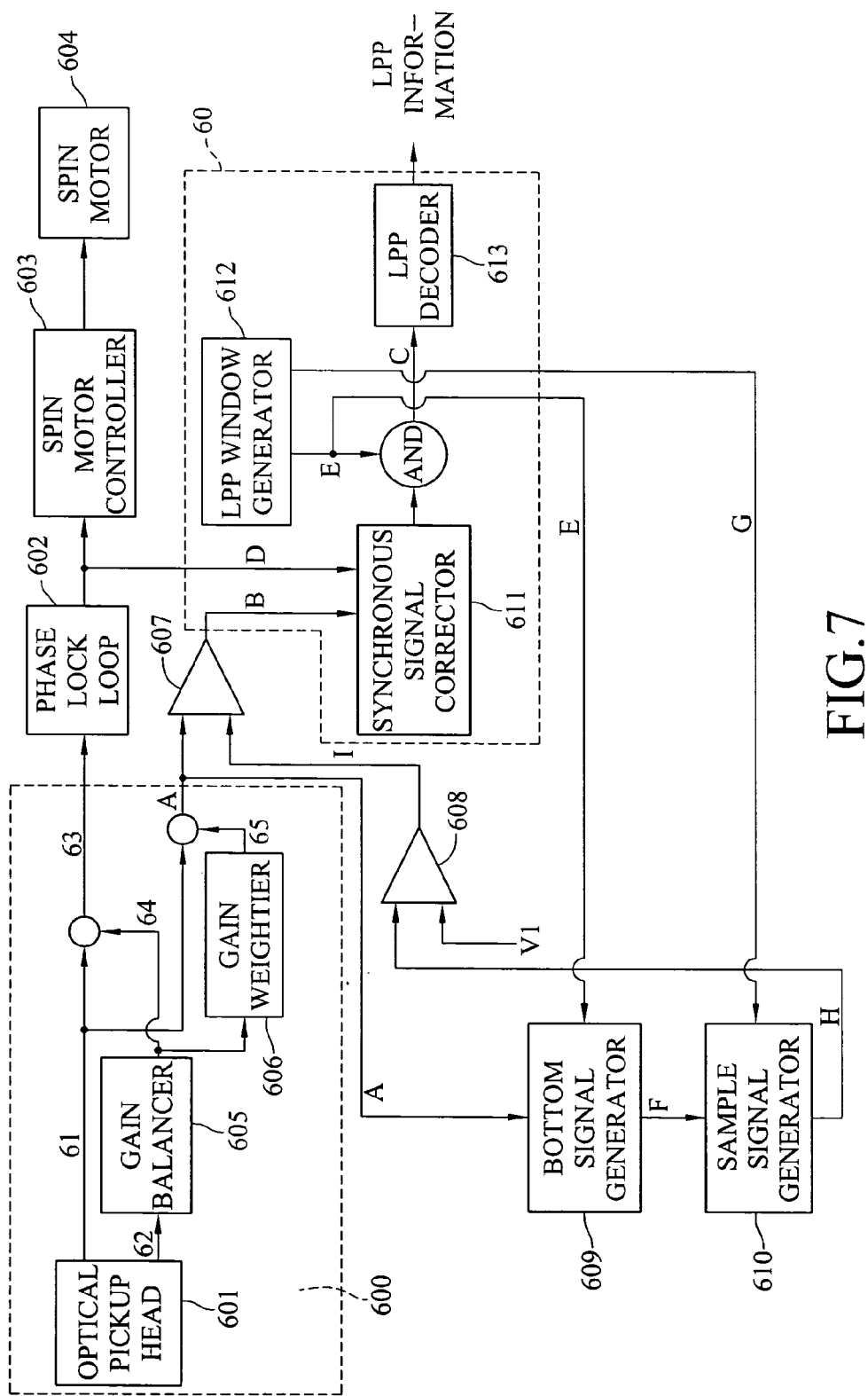
FIG. 7 is the circuit of LPP signal automatic slice level detecting device of the invention.

FIG. 7 illustrates the circuit of the LPP signal level automatic detecting device. The circuit corresponding to the signals in FIG. 6 is described in details.

An optical pickup head 601 of an optical pickup circuit 600 in a writable DVD drive accesses the digital data on the disk. A second signal 62 is delivered to a gain balancer 605 to obtain a fourth signal 64, whose amplitude is the same as the first signal 61. A third signal 63 is generated by the first signal 61 and the fourth signal 64 through a push-pull method. The third signal 63 is then transmitted to a spin motor controller 603 through the wobble phase lock loop (PLL) 602, thereby controlling the spin motor 604 in the drive. The control signal can be implemented by prior art.

The fourth signal 64 is delivered to a gain weightier 606 to generate the fifth signal 65 such that the signal to noise ratio of the LPP signal and the wobble signal is raised through adjusting the first signal 61 and the fifth signal 65. The fifth signal 65 and the first signal 61 are added to obtain the LPP signal A, which is delivered to a comparator 607 and a bottom signal generator 609 respectively. The bottom signal generator 609 produces the LPP bottom signal F, which is shown in FIG. 6, through the LPP signal A and the LPP window E from the digital processor 60. The sample signal generator 610 receives the LPP bottom signal F and the sample signal from the digital processor 60 to obtain a level hold signal H. The level hold signal H and a constant LPP slice signal V1 generated by a fixed voltage are transmitted to an analog computer 608, thereby producing the LPP sliced level signal I.

The comparator 607 receives the LPP signal A, which is processed by the gain balancer 605 and the gain weightier 606, and the LPP sliced level signal I. The two signals are compared to obtain the LPP signal B as shown in FIG. 6.

The bottom signal generator 609 and the sample signal generator 610 receive the LPP window E and the sample signal G from the digital processor 60 to obtain the sliced level signal H.

The digital processor 60 includes a synchronous signal corrector 611, a LPP window generator 612, and a LPP decoder 613. The synchronous signal corrector 611 receives the LPP sliced signal B from the comparator 607 and the wobble clock D from the PLL 602 for synchronous correction. The LPP window generator 612 receives the fixed wobble clock generated from PLL 602, thereby generating a signal that is open for three pulses and closed for five pulses, which signal is shown in FIG. 6. The LPP window E and the LPP signal from the synchronous signal corrector 611 are proceeded AND logic computation to generate the protected LPP signal C. The LPP decoder 613 receives the protected LPP signal C for decoding the land pre-pits to obtain the land pre-pits information.

The automatic adjusting slice level of the land pre-pits is obtained by the slice level, which is generated by the bottom signal generator 609 and the sample signal generator 610, through the analog computer 608. Then the LPP position signal C is obtained through the comparator 607, the synchronous corrector 611 and the LPP window generator 612. Finally, the precise LPP information is obtained from the LPP decoder 613.

The LPP signal level automatic detecting device of the invention utilizes a LPP signal level automatic detection technology to detect the variation of the wobble signal, to overcome the drawback of the conventional technology. The accuracy of the LPP signal is improved by digital logic computation, and the unnecessary glitches are eliminates. The error rate of decoding LPP signals due to the LPP signals error reduces substantially.

Reading the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A land pre-pits signal level automatic detecting device, which employs a digital processor to recognize the practical position of the land pre-pits (LPP) signal, employing a automatic slice level, which is composed by level automatic detection of the RC circuit and a fixed slice level, as the basis for detecting the land pre-pits, the device comprising:

a bottom signal generator, which is coupled to an optical pickup circuit, for receiving a land pre-pits (LPP) signal and a land pre-pits window to generate a land pre-pits bottom hold signal;

a sample signal generator, which is coupled to the bottom signal generator, for receiving the LPP bottom signal and a sample and hold signal to generate a hold level signal;

an analog computer, which is coupled to the sample signal generator, for receiving the hold level signal and a fixed slice level to generate a sliced level signal after analog addition;

a comparator, which is coupled to the analog computer and the optical pickup circuit, for receiving the LPP signal and the sliced level signal thereby generating a LPP sliced signal; and a digital processor, which is coupled to the comparator, for receiving the LPP sliced signal and a wobble clock to generate the LPP window and the sample and hold signal.

2. The device of claim 1, wherein the digital processor further comprises a synchronous signal corrector, a LPP window generator, and a LPP decoder.

3. The device of claim 1, further comprises a phase lock loop for generating the wobble clock, and for coupling a LPP window generator and a synchronous signal corrector.

4. The device of claim 1, wherein the digital processor couples the comparator, a phase lock loop, the bottom signal generator, and the sample signal generator.

5. The device of claim 1, wherein the LPP window is open for three pulses and closed for five pulses.

6. The device of claim 2, wherein the synchronous signal corrector and the LPP window generator generate a protected LPP signal, which is delivered to the LPP decoder.

7. The device of claim 2, wherein the LPP window generator generates the LPP window signal, which is delivered to the LPP decoder.

* * * * *